US011406062B2

(12) United States Patent
Schrag et al.

(10) Patent No.: US 11,406,062 B2
(45) Date of Patent: Aug. 9, 2022

(54) AGRICULTURAL HARVESTER WITH A FEEDER HOUSE HAVING A LOCKING AXLE ASSEMBLY

(71) Applicant: AGCO Corporation, Duluth, GA (US)

(72) Inventors: Steven John Schrag, Hesston, KS (US); Rex Schertz, Hesston, KS (US); James H. Rogers, Hesston, KS (US)

(73) Assignee: AGCO Corporation, Hesston, KS (US)

( * ) Notice: Subject to any disclaimer, the term of this patent is extended or adjusted under 35 U.S.C. 154(b) by 202 days.

(21) Appl. No.: 16/618,486

(22) PCT Filed: Apr. 24, 2018

(86) PCT No.: PCT/IB2018/000421
§ 371 (c)(1),
(2) Date: Dec. 2, 2019

(87) PCT Pub. No.: WO2018/220433
PCT Pub. Date: Dec. 6, 2018

(65) Prior Publication Data
US 2021/0144924 A1    May 20, 2021

Related U.S. Application Data

(60) Provisional application No. 62/513,503, filed on Jun. 1, 2017.

(51) Int. Cl.
*A01D 67/00* (2006.01)
*A01D 41/127* (2006.01)
(Continued)

(52) U.S. Cl.
CPC .......... *A01D 67/00* (2013.01); *A01D 41/127* (2013.01); *A01D 41/145* (2013.01); *A01D 69/03* (2013.01)

(58) Field of Classification Search
CPC .... A01D 67/00; A01D 41/127; A01D 41/145; A01D 69/03; A01D 41/144;
(Continued)

(56) References Cited

U.S. PATENT DOCUMENTS 4,414,792 A  * 11/1983  Bettencourt ......... A01D 41/141
                                                        56/10.2 E
4,585,076 A  *  4/1986  Stevens .................. A01B 73/00
                                                        172/240

(Continued)

FOREIGN PATENT DOCUMENTS

DE      102008044486 A1    4/2009
EP        1 721 508 A1    11/2006
(Continued)

OTHER PUBLICATIONS

UK Intellectual Property Office, Search Report for related UK Application No. GB1709181.0, dated Dec. 15, 2017.
(Continued)

*Primary Examiner* — Alicia Torres
*Assistant Examiner* — Madeline I Runco

(57) ABSTRACT

An agricultural harvester, such as a combine harvester, which has an auxiliary axle assembly for support of the feeder house of the harvester. The auxiliary axle assembly can be provided in a retracted position when in a field mode, and can be locked in an extended position when in a road mode, where a wheel of the assembly contacts the ground. When in the locked, extended position, the auxiliary axle assembly supports substantially all of the weight of the feeder house and any attached implements, allowing the feeder house to pivot relative to the main chassis of the harvester.

13 Claims, 3 Drawing Sheets

(51) Int. Cl.
   *A01D 41/14* (2006.01)
   *A01D 69/03* (2006.01)
(58) Field of Classification Search
   CPC ..... A01D 2101/00; A01D 41/00–41/16; A01B 63/002; A01B 63/045; A01B 63/16; A01B 63/166; A01B 63/22
   See application file for complete search history.

(56) References Cited

U.S. PATENT DOCUMENTS

| | | | |
|---|---|---|---|
| 7,467,506 B2 * | 12/2008 | Lovett | A01D 61/002 56/15.8 |
| 7,707,811 B1 * | 5/2010 | Strasser | A01D 41/141 56/10.2 E |
| 7,908,838 B2 * | 3/2011 | Hohlfeld | A01D 43/081 56/228 |
| 3,025,312 A1 | 9/2011 | Honas et al. | |
| 8,245,489 B2 * | 8/2012 | Talbot | A01D 41/141 56/10.2 E |
| 9,125,343 B2 * | 9/2015 | Duquesne | A01D 41/16 |
| 9,334,003 B2 * | 5/2016 | Segard | B60D 1/30 |
| 9,357,706 B2 * | 6/2016 | Lohrentz | A01D 41/16 |
| 9,986,685 B2 * | 6/2018 | Smith | A01D 41/127 |
| 10,253,789 B2 * | 4/2019 | Brockmann | A01D 41/145 |
| 10,278,330 B2 * | 5/2019 | Silver | A01F 12/44 |
| 2003/0014955 A1 | 1/2003 | Heidjann et al. | |
| 2007/0163791 A1 | 7/2007 | Meek | |
| 2014/0262373 A1 * | 9/2014 | Landoll | A01B 63/22 172/260.5 |
| 2015/0121829 A1 | 5/2015 | Duquesne et al. | |

FOREIGN PATENT DOCUMENTS

| | | | | |
|---|---|---|---|---|
| EP | 2 156 725 A1 | 2/2010 | | |
| EP | 2436260 A1 | 4/2012 | | |
| EP | 2 868 185 A1 | 5/2015 | | |
| WO | WO-2013132468 A1 * | 9/2013 | | B60S 9/00 |
| WO | WO-2018055442 A1 * | 3/2018 | | A01D 41/12 |

OTHER PUBLICATIONS

European Patent Office, International Search Report for Related International Application No. PCT/2018//182018/000421, dated Sep. 12, 2018.

* cited by examiner

AGRICULTURAL HARVESTER WITH A FEEDER HOUSE HAVING A LOCKING AXLE ASSEMBLY

BACKGROUND

Field of the Invention

The present invention relates to an agricultural harvester, preferably a combine harvester, having an auxiliary axle system.

Description of Related Art

Many regulatory bodies limit the amount of weight that can be carried by each axle of an agricultural machine when driven on public roads. The solution in the industry has been to add a third axle to take some of the weight off of the primary axles when operating on the road.

An example of a third-axle design can be found in U.S. Pat. No. 9,125,343, which describes the use of an auxiliary axle for a feeder house of a combine harvester. The auxiliary axle can be deployed to support some of the weight of the feeder house when in a road mode. The axle is provided with a hydraulic actuator which provides a substantially constant down force between the axle assembly and the ground.

A challenge with such third-axle designs is controlling how much load each axle carries, which requires careful management of the hydraulic cylinder of the axle assembly.

It is an object of the invention to provide an auxiliary axle system for an agricultural harvester which addresses the above challenges.

SUMMARY OF THE INVENTION

Accordingly, there is provided an agricultural harvester comprising:
 a chassis;
 a feeder house pivotally mounted to the chassis;
 at least one auxiliary axle assembly for the feeder house, the auxiliary axle assembly deployable between a retracted position for a field mode and an extended position for a road mode where at least one wheel of the auxiliary axle assembly contacts the ground; and
 at least one hydraulic lift cylinder coupled between the chassis and the feeder house, the hydraulic lift cylinder arranged to adjust the height of the feeder house and any connected implements/headers,
 wherein when in a road mode, the auxiliary axle assembly is locked in the extended position and the hydraulic lift cylinder is configured in a float mode, such that weight of feeder house is supported by the at least one auxiliary axle assembly as the feeder house pivots relative to the chassis.

The use of a lockable auxiliary axle assembly for the feeder house of a harvester allows for the weight of the feeder house to be substantially supported by the locked axle, while allowing the feeder house to pivot relative to the chassis. Setting the lifting cylinder in a float mode provides for a damping effect for the movement of the feeder house.

The system of the invention provides a relatively simple and effective solution to the challenges of using prior art auxiliary axles, without the need for relatively expensive additional components to control and adjust hydraulic pressure of an auxiliary axle solution.

It will be understood that the agricultural harvester is preferably a combine harvester, but the invention may also be used on other harvesting machine types.

Preferably, the at least one hydraulic lift cylinder is configured to be fluidly coupled with a hydraulic accumulator when in said road mode. The hydraulic accumulator may be provided as part of the harvester.

Preferably, the agricultural harvester comprises a controller coupled with said at least one hydraulic lift cylinder, the controller configured to switch the at least one hydraulic lift cylinder between a field mode and a road mode.

The controller is configured to receive a user input to switch between a field mode and a road mode.

Preferably, the agricultural harvester further comprises at least one sensor device arranged to detect the status of the auxiliary axle assembly between the retracted position and the extended position, and/or the locking status of the auxiliary axle assembly, the at least one sensor device communicatively linked with the controller.

Preferably, the controller is configured to not switch the at least one hydraulic lift cylinder into a road mode unless the at least one sensor detects that the auxiliary axle assembly is locked in the extended position.

Preferably, the agricultural harvester comprises at least one actuator arranged to control the deployment of the at least one auxiliary axle assembly between the retracted position and the extended position.

Preferably, the at least one actuator is controlled by the controller.

Preferably, the at least one actuator comprises at least one of the following: a hydraulic actuator, a pneumatic actuator, an electromechanical actuator.

Alternatively, the auxiliary axle assembly is manually deployable between the retracted position and the extended position, e.g. using a wheel crank system.

Preferably, the agricultural harvester comprises a locking mechanism to secure the auxiliary axle assembly in the extended position.

The locking mechanism can comprise any suitable lock system, e.g. a latching mechanism, an electromechanical or electromagnetic lock, a locking collar or locking bolt used to secure the auxiliary axle in place.

It will be understood that the locking mechanism may be controlled by the controller, or the locking mechanism may be manually actuated by an operator at the auxiliary axle assembly.

In a further aspect of the invention, there is provided an auxiliary axle assembly provided as a kit for attachment to a feeder house of an agricultural harvester, to form an agricultural harvester as described above.

The auxiliary axle assembly can be easily retrofitted to an existing harvester, to provide the benefits of the invention as described above. The auxiliary axle assembly preferably comprises at least one wheel provided on an axle mechanism, the axle mechanism deployable between a retracted position and an extended position. The axle assembly may comprise at least one actuator arranged to control the deployment of the axle assembly between the two positions.

BRIEF DESCRIPTION OF THE DRAWINGS

Embodiments of the invention will now be described, by way of example only, with reference to the accompanying drawings, in which.

It will be understood that the drawings are provided as illustrative examples, and are not provided to scale.

DETAILED DESCRIPTION OF THE INVENTION

Figure 1:
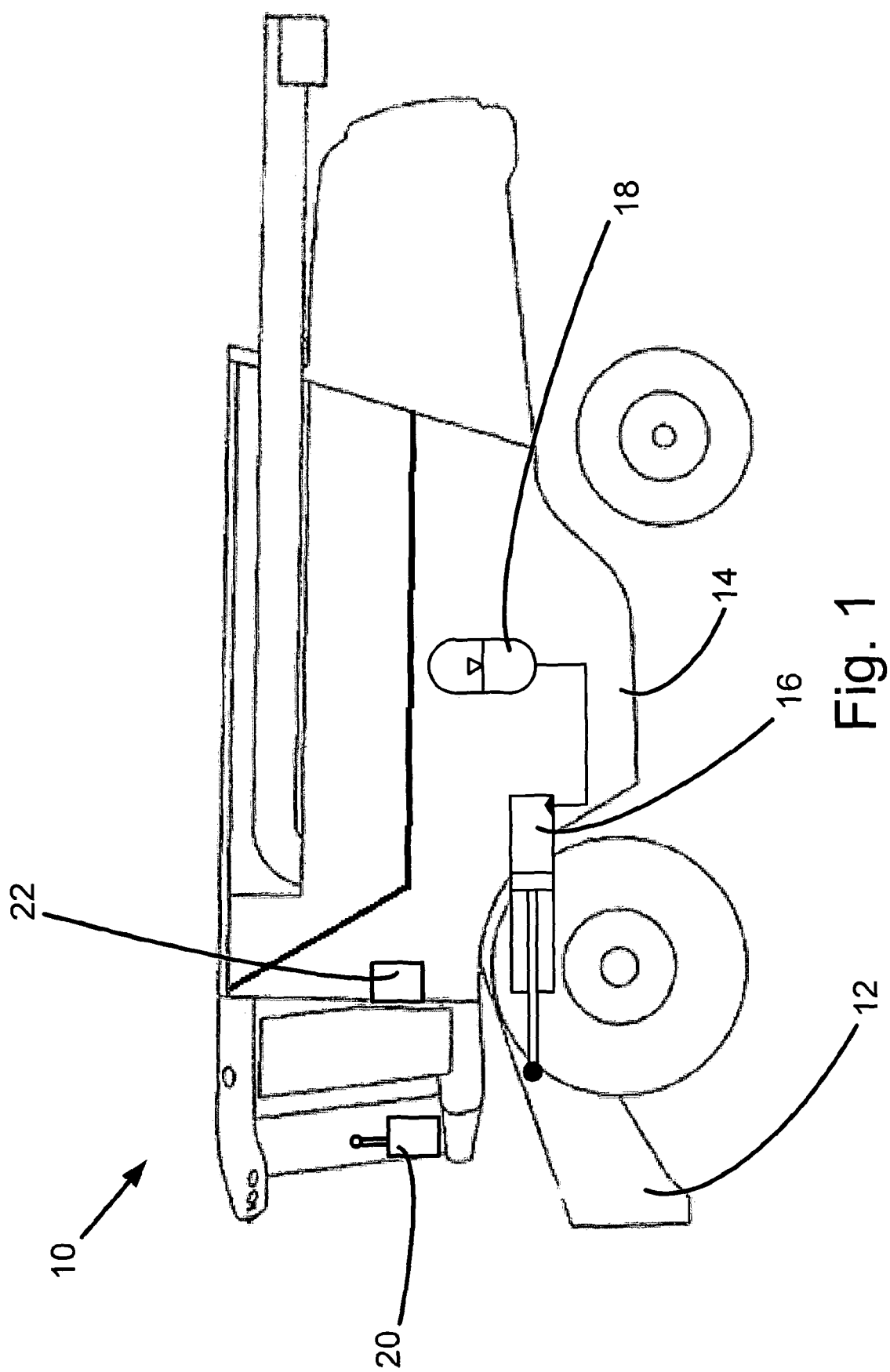
FIG. 1 is an illustration of an agricultural harvester according to the invention.

With reference to FIG. 1, an agricultural harvester in the form of a combine harvester is indicated at 10. The combine harvester 10 is provided with a feeder house 12 at the front of the harvester 10, the feeder house 12 pivotally mounted to the chassis 14 of the harvester 10. The feeder house 12 is used for the mounting of implements such as headers, cutter bars, etc. to the front of the harvester 10, for the harvesting of crops. Adjustment of the height of the feeder house 12 and any attached implements can be controlled using at least one hydraulic lift cylinder 16, which is schematically indicated in FIG. 1. The lift cylinder 16 is pivotally coupled to the feeder house 12 and the harvester chassis 14, such that extension or retraction of the lift cylinder 16 acts to pivot the feeder house 12 on the chassis 16. The lift cylinder 16 can be supplied with hydraulic fluid from hydraulic accumulator 18.

The harvester 10 further comprises a driver station 20 which is used to control the operation of the harvester 10. It will be understood that the driver station 14 comprises various input devices, e.g. steering wheels, acceleration and brake pedals, ground drive joysticks, etc., which may be used to control the combine systems and drive. In addition, the driver station 20 comprises information display devices, e.g. instrument dials, display terminals, touchscreen panels, etc., for the display and manipulation of data relating to harvester operation.

The harvester 10 comprises a controller 22 or Electronic Control Unit (ECU), which can interface with the inputs and outputs of the driver station 20, and with the various sensors and systems of the harvester 10. The controller 22 allows an operator to monitor & control the operation of the harvester 10 from the driver station 20. The controller 22 can be used to control the status of the lift cylinder 16, e.g. to control extension or retraction of the cylinder.

Figure 2:
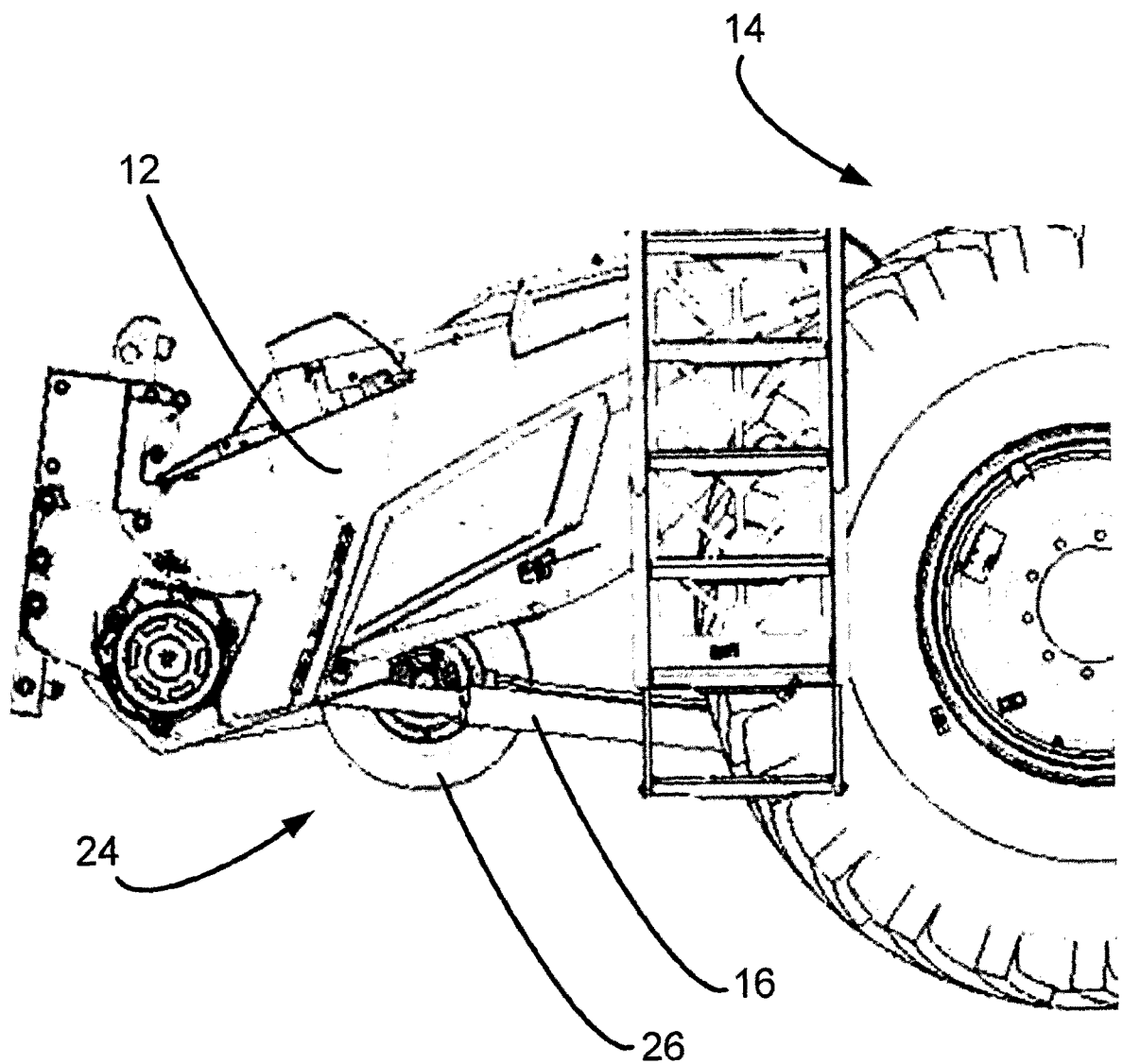
FIG. 2 is an enlarged view of a portion of the harvester of FIG. 1, showing an auxiliary axle assembly in a retracted position for a field mode.
Figure 3:
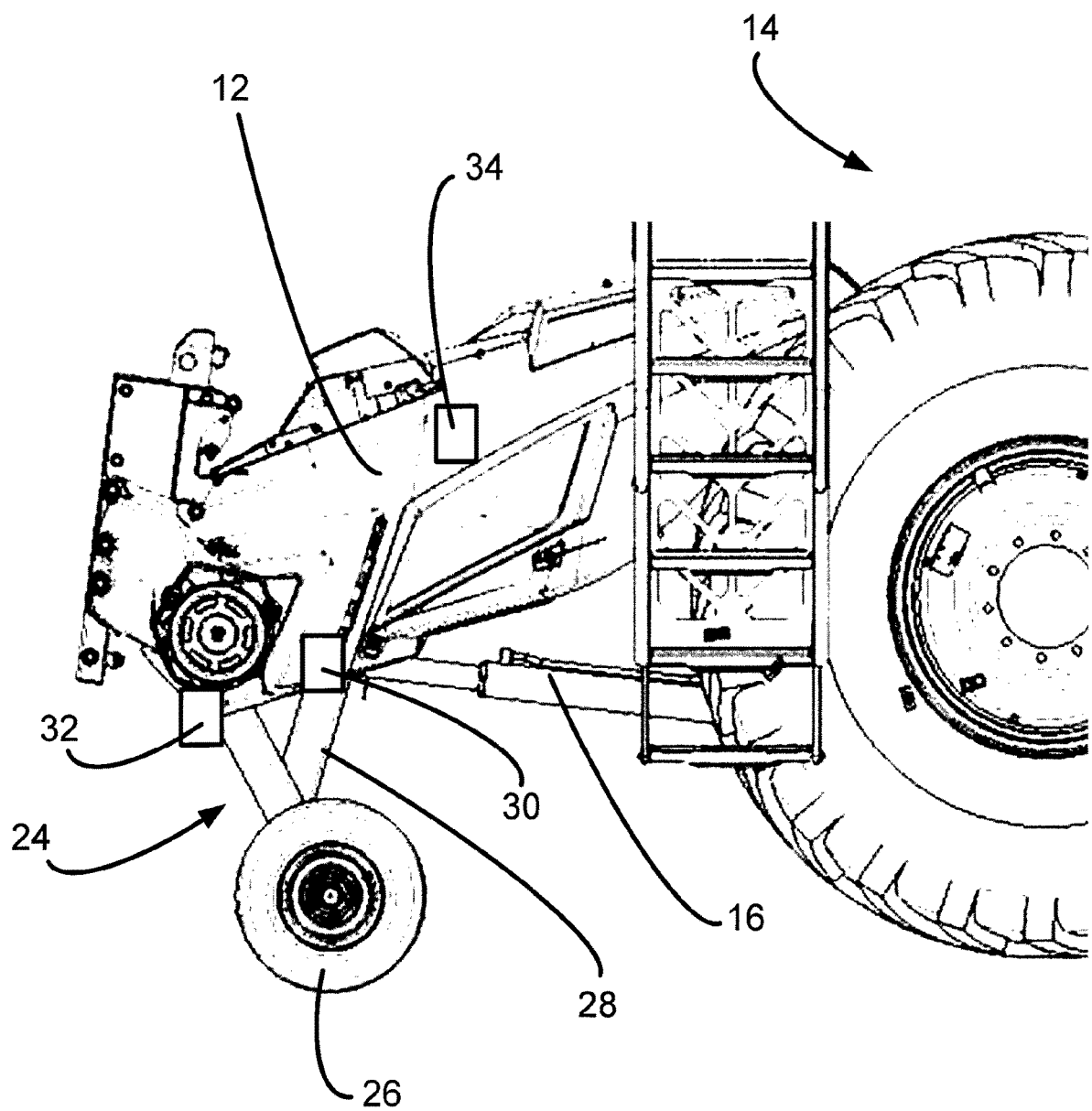
FIG. 3 shows the enlarged view of FIG. 2, when the auxiliary axle assembly is in the extended position for a road mode.

An enlarged view of the feeder house area of the harvester 10 is shown in FIGS. 2 and 3. The feeder house 12 is provided with a deployable auxiliary axle assembly 24, having at least one wheel 26. The auxiliary axle assembly 24 can be deployed between a retracted position, where the wheel 26 is at least partly retained in the feeder house 12 (as shown in FIG. 2), and an extended position, where the wheel 26 can be used to contact the ground (as shown in FIG. 3).

The retracted position of the assembly 24 is intended for use in a field mode of operation of the harvester 10, when the feeder house 12 and any attached implements are used for the working or harvesting of crops. The extended position of the assembly 24 is intended for use in a road mode of operation of the harvester 10, wherein a substantial portion of the weight of the feeder house 12 and any attached implements can be borne by the auxiliary axle assembly 24, thereby satisfying any regulatory requirements regarding axle-to-weight ratios required for road transportation.

The auxiliary axle assembly 24 comprises a linkage system 28 (FIG. 3) having beams or rods supporting the wheel 26, and which incorporates a locking mechanism 30. The locking mechanism 30 acts to secure the auxiliary axle assembly 24 in the extended position, such that the weight of the feeder house 12 is securely supported by the wheel 26.

In one aspect, the locking mechanism 30 can comprise any suitable lock system, e.g. a latching mechanism, an electromechanical or electromagnetic lock, a locking collar or locking bolt used to secure the auxiliary axle in place. The locking mechanism 30 may be remotely controlled by the controller 22, or the locking mechanism 30 can be manually actuated by an operator at the auxiliary axle assembly 24, e.g. by manual application of a locking bolt or collar to secure the linkage system 28 in the extended position.

In one embodiment, the auxiliary axle assembly 24 comprises at least one actuator device 32 (FIG. 3) which serves to control the deployment of the assembly 24 between the extended and retracted positions. The actuator 32 can be operated by the controller 22, to allow deployment of the auxiliary axle assembly 24 by an operator from the driver station 20. The actuator 32 may comprise any one or more of the following: a hydraulic actuator, a pneumatic actuator, an electromechanical actuator. In an alternative or additional aspect, the actuator 32 may allow for manual deployment of the assembly 24 by an operator, e.g. by use of a wheel crank system or similar.

When the assembly 24 is deployed to the extended position as shown in FIG. 3, where the wheel 26 acts to support the feeder house 12 on the ground, the lift cylinder 16 connected between the feeder house 12 and the chassis 14 of the harvester 10 is set to a "float" condition. This allows the lift cylinder 16 to extend and retract freely while the feeder house 12 pivots at the connection to the chassis 14. The activation of the float mode may be accomplished by connecting the cylinder 16 with the hydraulic accumulator 18. The activation of the float mode of the cylinder 16 can be operated by the controller 22.

It will be understood that the controller 22 is configured to switch the operation of the auxiliary axle assembly between a field mode and a road mode, based on a user input received from the driver station 20. Additionally or alternatively, the controller may be adapted to switch between the modes automatically, based on the monitored status of the harvester 10. For example, if the controller 22 detects that the harvester is operating at a relatively high speed indicative of road transportation, or detects using a positional awareness system that the harvester 10 is currently travelling on a road, the controller 22 may act to automatically switch the axle assembly 24 into a road mode without specific user command.

The auxiliary axle assembly 24 is further preferably provided with at least one sensor 34 (FIG. 3), which can be used to monitor the status of the assembly 24. The sensor 34 can be used to detect the current status of the assembly 24, e.g. whether the assembly 24 is in the extended or retracted position, and/or the locking status of the locking mechanism 30.

The sensor 34 is provided in communication with the controller 22, such that the assembly status may be observed by an operator from the driver station 20. The controller 22 is configured to control the operation of the assembly 24, based at least in part on the output of the sensor 34. In a preferred aspect, the controller 22 is configured to not switch the lift cylinder 16 into a road mode unless the sensor 34 detects that the auxiliary axle assembly 24 is locked in the extended position. Such a configuration provides a safety feature for the operation of the assembly 24.

As a result of the configuration of the assembly 24, the determining factor on the weight carried by the auxiliary axle assembly 24 is how much the feeder house 12 weighs and the location of the assembly 24 relative to the feeder house 12 centre of gravity. This allows for a significant amount of weight to be removed from the harvester's main front axle while a small amount is shifted to the rear axle to meet the road regulations governing allowable weight carrying capacity per axle.

The use of a lockable axle assembly for the feeder house provides a relatively simple and effective solution to the challenges of using prior art auxiliary axles, without the need for relatively expensive additional components to control and adjust hydraulic pressure of an auxiliary axle solution. The hydraulic lift cylinders used for adjustment of the feeder house itself can be set to a float condition to allow for damping of movement of the feeder house, as it pivots relative to the harvester chassis.

In a further aspect of the invention, it will be understood that the auxiliary axle assembly 24 can be provided as a kit for attachment or retrofitting to an existing harvester 10. The kit may be arranged to be controlled by the existing harvester control systems, e.g. a general-purpose ECU, or the kit may be provided with a dedicated ECU which can interface with existing harvester systems.

The invention is not limited to the embodiments described herein, and may be modified or adapted without departing from the scope of the present invention.

The invention claimed is:

1. An agricultural harvester, comprising:
    a chassis;
    a feeder house pivotally mounted to the chassis;
    at least one auxiliary axle assembly for the feeder house, the auxiliary axle assembly deployable between a retracted position for a field mode and an extended position for a road mode where at least one wheel of the auxiliary axle assembly contacts the ground;
    a locking mechanism configured to lock the auxiliary axle assembly in the extended position; and
    at least one hydraulic lift cylinder coupled between the chassis and the feeder house, the hydraulic lift cylinder configured to adjust the height of the feeder house and any connected implements,
    wherein when in the road mode, the auxiliary axle assembly is locked in the extended position and the hydraulic lift cylinder is configured in a float mode, such that the weight of the feeder house is supported by the at least one auxiliary axle assembly as the feeder house pivots relative to the chassis.

2. The agricultural harvester of claim 1, wherein the at least one hydraulic lift cylinder is configured to be fluidly coupled with a hydraulic accumulator when in the road mode.

3. The agricultural harvester of claim 1, wherein the agricultural harvester comprises a controller coupled with the at least one hydraulic lift cylinder, the controller configured to switch the at least one hydraulic lift cylinder between the field mode and the road mode.

4. The agricultural harvester of claim 3, wherein the controller is configured to receive a user input to switch between the field mode and the road mode.

5. The agricultural harvester of claim 3, wherein the agricultural harvester further comprises at least one sensor wherein the sensor is communicatively linked with the controller, wherein the sensor is configured to detect at least one condition selected from the group consisting of: the auxiliary axle is in the retracted position; the auxiliary axle is in the extended position; and the auxiliary axle assembly position is locked.

6. The agricultural harvester of claim 5, wherein the controller is configured to prevent the at least one hydraulic lift cylinder from switching to the road mode unless the at least one sensor detects that the auxiliary axle assembly is locked in the extended position.

7. The agricultural harvester of claim 1, wherein the agricultural harvester comprises at least one actuator arranged to control deployment of the at least one auxiliary axle assembly between the retracted position and the extended position.

8. The agricultural harvester of claim 7, wherein the at least one actuator is controlled by a controller.

9. The agricultural harvester of claim 7, wherein the at least one actuator comprises at least one of a hydraulic actuator, a pneumatic actuator, and an electromechanical actuator.

10. The agricultural harvester of claim 1, wherein the auxiliary axle assembly is manually deployable between the retracted position and the extended position.

11. The agricultural harvester of claim 1, wherein the locking mechanism comprises at least one selected from the group consisting of the following: a latching mechanism, an electromechanical or electromagnetic lock, a locking collar, and a locking bolt used to secure the auxiliary axle in place.

12. The agricultural harvester of claim 1, wherein the locking mechanism is controlled by a controller.

13. An auxiliary axle assembly kit for attachment of an auxiliary axle assembly to a feeder house pivotally mounted to a chassis of an agricultural harvester comprising:
    at least one auxiliary axle assembly deployable between a retracted position for a field mode and an extended position for a road mode where at least one wheel of the auxiliary axle assembly contacts the ground; and
    at least one hydraulic lift cylinder for coupling the chassis and the feeder house of the agricultural harvester, the hydraulic lift cylinder configurable to adjust the height of the feeder house and any connected implements,
    wherein when in the road mode, the auxiliary axle assembly is locked in the extended position and the hydraulic lift cylinder is in a float mode, such that the weight of the feeder house is supported by the at least one auxiliary axle assembly as the feeder house pivots relative to the chassis.

* * * * *